Oct. 14, 1952　　　　　A. G. TALBERT　　　　　2,613,945
COUPLING FOR TRACTOR AND SEMITRAILER UNITS
Filed March 15, 1950　　　　　　　　　　2 SHEETS—SHEET 1
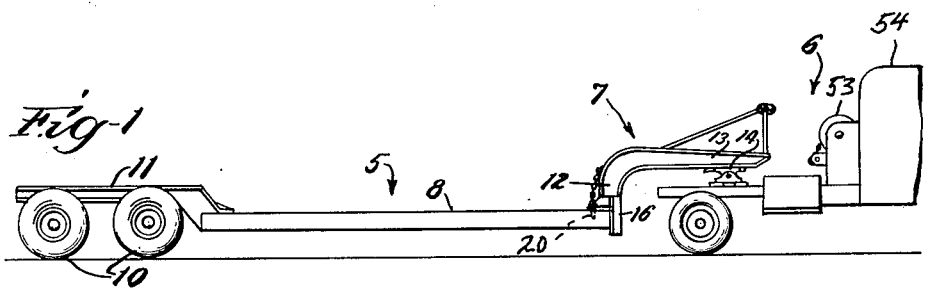
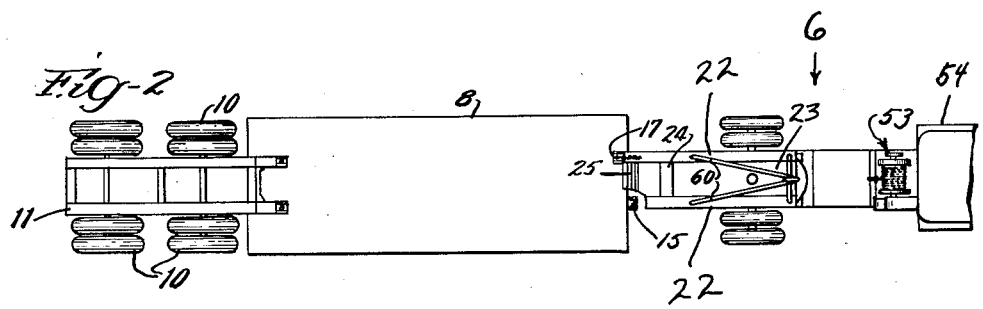
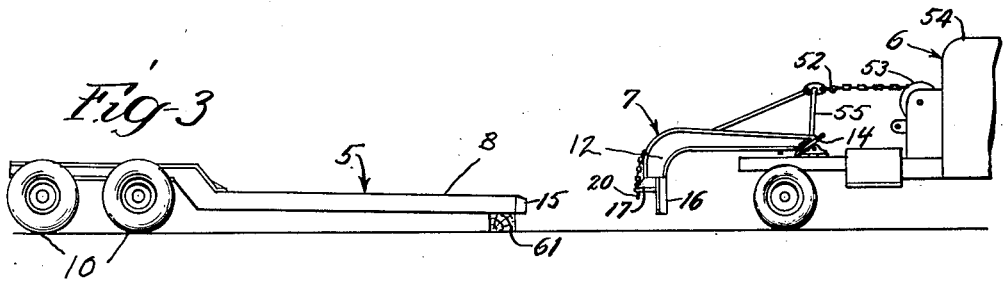
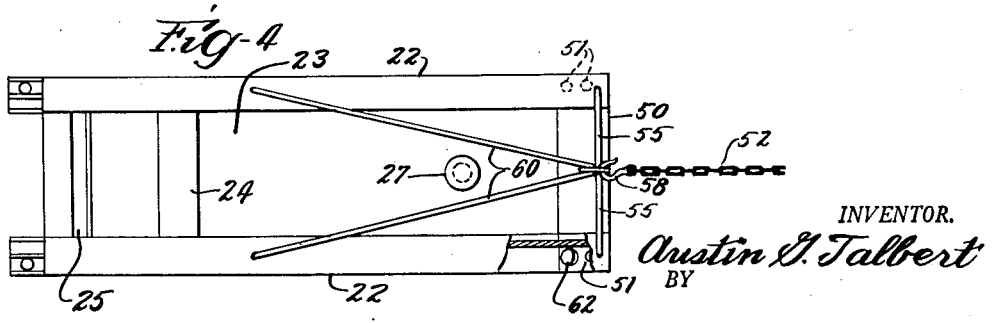
INVENTOR.
Austin G. Talbert
BY
Cromwell, Greist & Warden Attys.

Oct. 14, 1952   A. G. TALBERT   2,613,945
COUPLING FOR TRACTOR AND SEMITRAILER UNITS
Filed March 15, 1950   2 SHEETS—SHEET 2
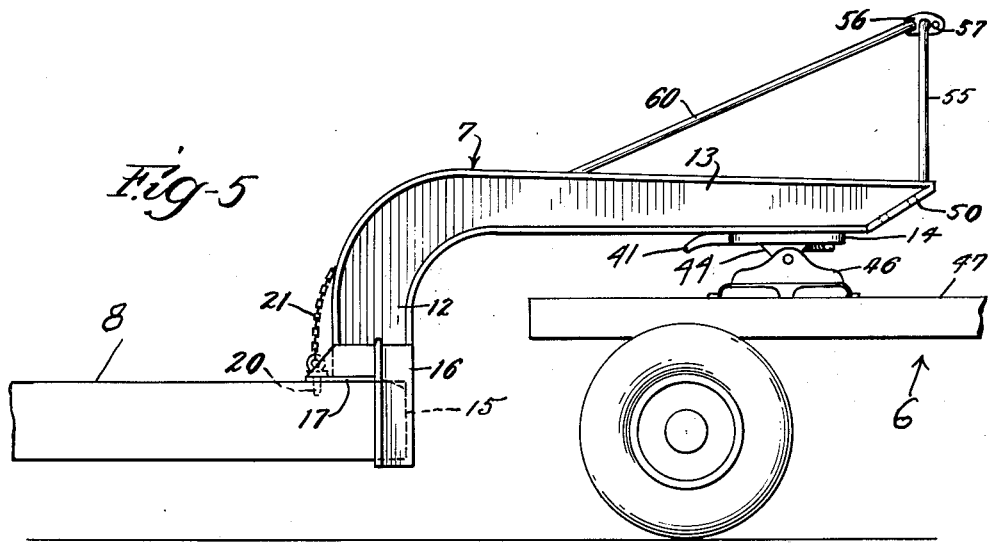
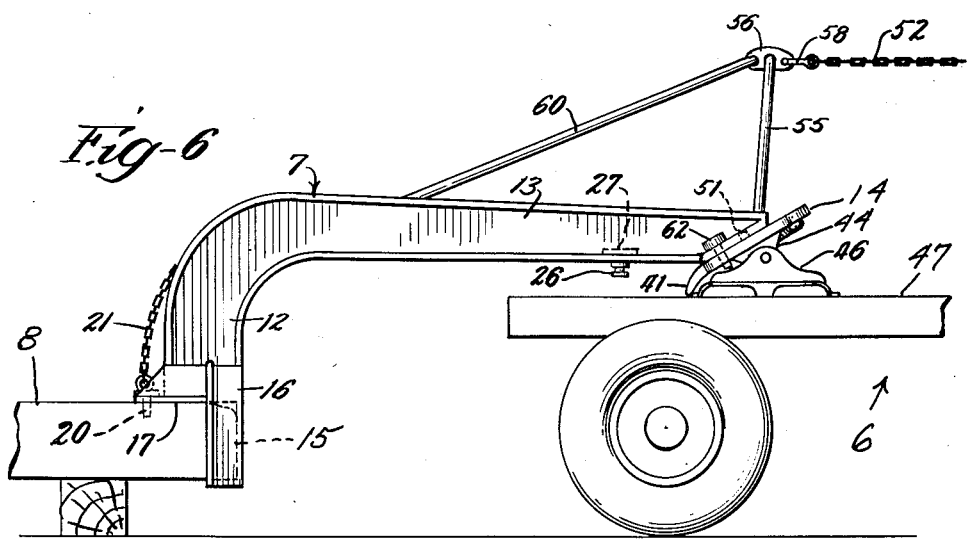
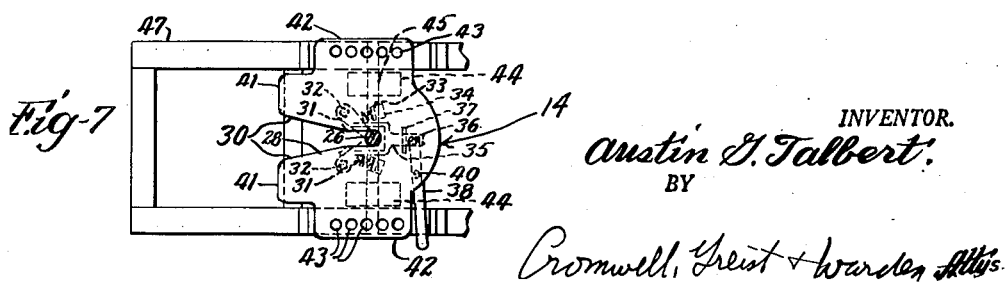
INVENTOR.
Austin G. Talbert
BY
Cromwell, Greist & Warden Attys.

Patented Oct. 14, 1952

2,613,945

UNITED STATES PATENT OFFICE 2,613,945

COUPLING FOR TRACTOR AND SEMITRAILER UNITS

Austin G. Talbert, Lyons, Ill.

Application March 15, 1950, Serial No. 149,748

7 Claims. (Cl. 280—33.05)

This invention relates generally to improvements and innovations in gooseneck type drawbar units for detachably interconnecting the front ends of low-bed, heavy duty trailers having only rear support wheels with the fifth wheels of tractors.

In my previous Patent No. 2,489,112 granted November 22, 1949, I have disclosed one form of removable gooseneck type drawbar unit with associated fifth-wheel plate structure for use in detachably connecting a low-bed, heavy duty trailer having only rear support wheels with a tractor having a fifth wheel. The present invention is directed to a new and different construction, for the same general purpose.

Low-bed, heavy duty trailers having supporting wheels at the rear end only are in wide use, particularly for transporting heavy machinery such as power shovels, bulldozers, ditch-diggers and other earth-working and moving machines. These low-bed, heavy duty trailers are transported cross-country by highly mobile tractor units with gooseneck type drawbars being used to form the detachable connection between the trailer and the tractor. When it is desired to unload a piece of heavy machinery from one of the low-bed trailers, it is customary to place a timber or other blocking under the front end of the trailer and then to disconnect the gooseneck from the front end of the trailer and then drive the tractor off, with the gooseneck attached thereto at its forwardly extending front end. It is not ordinarily practical to block up the front end of a loaded trailer unit in such a way that there is no lowering or settling of this end when the gooseneck is disconnected. Since the trailer body pivots about the rear supporting wheels when the front end is lowered or allowed to settle, it will also be tilted downwardly. Accordingly, in order that the downwardly depending rear end of the gooseneck drawbar unit may be maintained in square relationship with respect to the front end of the trailer when the latter settles on the blocking, it is necessary for the gooseneck to be correspondingly lowered and tilted.

An important object of the invention is a gooseneck type drawbar unit for interconnecting the front end of a low-bed, heavy duty trailer having only rear support wheels with a tractor having a fifth wheel, the gooseneck being adapted to be connected with and supported on the fifth wheel in a conventional manner for cross-country transport and further adapted to be released from such transporting position and displaced longitudinally to the rear of the tractor until an inclined bearing surface on the front end of the gooseneck engages and rides down the fifth wheel of the tractor in a rearwardly tilted position, with the transverse axis about which the fifth wheel is tiltable also constituting an axis about which the gooseneck drawbar unit is tiltable.

Another important object of the invention is a gooseneck type drawbar unit for combination with a low-body, heavy duty trailer unit having rear support wheels only and a tractor unit having a fifth-wheel plate which is rearwardly tiltable about an axis extending crosswise of the tractor, the gooseneck having a downwardly extending rear portion provided with coupling means cooperating with complementary coupling means on the front end of the trailer whereby the gooseneck may be rigidly connected with the front end of the trailer in square alignment therewith, the forwardly extending front portion of the gooseneck having a pintle pin set rearwardly from the front end of the gooseneck and arranged to be connected with the fifth-wheel plate during cross-country transport and arranged to be released from the fifth-wheel plate so that upon longitudinal displacement between the gooseneck and the tractor in a front-to-rear direction, an upwardly and forwardly inclined bearing surface provided on the front end of the gooseneck engages and rides down the fifth-wheel plate in a rearwardly tilted position. Additional means may be provided whereby various relative positions of the gooseneck on the tilted fifth-wheel plate may be obtained and secured, and a winch carried on the tractor may be used to support and control the angular or tilted position of the gooseneck about the transverse axis for the fifth-wheel plate. This arrangement permits the rear end of the gooseneck to be elevated or lowered and also tilted so that it may be maintained in, or brought into, square alignment with the front end of the trailer body when the gooseneck is being disconnected from the trailer and when it is being re-connected thereto.

Certain other objects of the invention will, in part, be obvious and will, in part, appear hereinafter.

For a more complete understanding of the nature and scope of the invention, reference may now be had to the following detailed description thereof taken in connection with the accompanying drawings, wherein:

Fig. 1 is a partially diagrammatic, side elevational view, partly broken away, showing a low-bed, heavy duty type trailer unit having rear support wheels only, connected by a gooseneck type drawbar unit embodying the present invention with a tractor unit having a rearwardly tiltable fifth-wheel plate, the connection between the gooseneck and the trailer and between the gooseneck and the tractor being that utilized for cross-country transport;

Fig. 2 is a top plan view of Fig. 1;

Fig. 3 is a side elevational view showing the gooseneck detached from the front end of the trailer of Fig. 1, the front end of the latter being blocked up and the gooseneck being supported on the tractor in a lowered and a slightly forwardly tilted position corresponding to a square interconnecting relationship with respect to the front end of the trailer in its downwardly tilted position;

Fig. 4 is a top plan view on enlarged scale of the gooseneck drawbar unit shown in Fig. 2;

Fig. 5 is a fragmentary side elevational view on enlarged scale showing the gooseneck drawbar unit of Fig. 1 interconnecting the trailer and the tractor for cross-country transport;

Fig. 6 is a side elevational view corresponding to Fig. 5 showing the gooseneck rigidly connected to the front end of the trailer unit in square alignment therewith, with the trailer front end tilted down and resting on blocking, and showing the relative position between the forward end of the gooseneck and the fifth-wheel corresponding to this position of the gooseneck; and Fig. 7 is a fragmentary top plan view of the fifth-wheel plate supported on the tractor frame.

Referring to Figs. 1–3, the reference numeral 5 designates, generally, a low-bed, heavy duty type trailer having rear supporting wheels only and adapted to be interconnected for cross-country transport with a tractor designated generally at 6, by means of a gooseneck form of drawbar unit which is designated generally at 7. The trailer 5 has a low slung bed or load-carrying platform 8 supported at its rear end on bogie wheels 10—10 disposed under a rear frame structure 11. The trailer unit 5 typifies any one of the several semi-trailer type units now in use and available for transporting heavy loads such as heavy earth-working machinery, e. g., power shovels, bulldozers, ditch-diggers, etc.

Gooseneck type drawbar units have been previously employed to detachably interconnect the front end of such a semitrailer unit with a tractor unit having a fifth-wheel plate supported on the rear end thereof. The gooseneck 7 has a downwardly projecting rear portion 12 and a forwardly extending, generally horizontal, portion 13. The bottom end of the downwardly projecting rear portion 12 is adapted to be rigidly interconnected with the front end of the trailer 5 while the forwardly extending portion 13 is arranged to be supported on the fifth-wheel plate 14 mounted on the tractor 6.

The gooseneck 7 has a modified construction at its front end which embodies the present invention, and the fifth-wheel plate 14 is correspondingly modified for cooperation therewith, as will be explained in detail below.

The coupling means for forming a rigid connection between the bottom end of the downwardly projecting rear portion 12 of the gooseneck 7 and the front end of the trailer 5 is known and does not form a part of the present invention. The bed 8 of the trailer 5 has a pair of spaced, male connecting elements or projections 15—15 mounted on the front end thereof which are designed to fit into socket openings in correspondingly spaced apart socket fixtures 16—16 depending from the opposite sides of the downwardly projecting portion 12. Adjacent the top of each of the fixtures 16 there is a rearwardly projecting plate 17 which is adapted to extend back over and rest on the top of the platform 8 immediately in rear of the respective projections 15 as shown, for example, in Figs. 2 and 5. The bottom surface of each of the coupling projections 15 rests on the bottom wall of its respective socket fixture 16 when the extensions 17 rest on the top surface of the platform 8. This arrangement prevents relative tilting between the gooseneck 7 and the trailer 5 and provides a rigid type connection. The connection is secured by a pair of pins 20—20 adapted to fit through a hole in each of the extensions 17 and project into a registering hole in the top of the platform 8 as shown, for example, in Fig. 5. Each of the pins 20 is secured on the end of a short length of chain 21 attached to the downwardly extending rear portion 12 of the gooseneck 7.

The gooseneck 7 may suitably be fabricated from flat steel plate by welding, or it may be built in other ways such as by bolting together castings. In the drawings, the gooseneck 7 has two gooseneck-shaped side members 22—22 which are I-shaped in cross section. The members 22 are interconnected at the bottom flanges by a floor plate 23 extending from the front to the rear of the gooseneck 7. Cross braces 24 and 25 extend between the top flanges of the members 22.

A downwardly depending pintle pin 26 (Fig. 6) is provided on the floor member 23 in the forward extending portion 13 and rearwardly of the front end of the gooseneck 7 and has a head 27 on the top end thereof which is welded to the floor member 23. The pintle pin 26 is adapted to be received and locked in the forward end of a slot 28 provided in the fifth-wheel plate 14, as shown in Fig. 7. The slot 28 has outwardly flared sides 30—30 to facilitate entrance of the pintle pin 26 therein. The pintle 26 is releasably locked in the position shown in Fig. 7 in the front end of the slot 28 by means of a pair of releasable catches 31—31 forming a part of known type pintle-pin locking mechanism. The catches 31 are pivoted adjacent their rear ends on pins 32—32 and are held in their locking positions by compression springs 33—33 connected at one end to the respective catches 31 and at the other end to respective supporting blocks 34—34 carried underneath the fifth-wheel plate 14.

The catches 31—31 are operated by a fork member 35 having a stem portion 36 which is slidable within a shackle 37 carried on the underside of the fifth-wheel plate 14. The fork 35 is operated by a lever 38 pivotally connected at one end to the fork stem 36 and intermediate its ends on a pin 40 projecting from the underside of the fifth-wheel 14. The outer end of the handle or lever 38 projects so that it is accessible to serve as an operating handle. By pushing rearwardly on the handle portion of the lever 38 the fork member 35 is drawn forwardly, thereby pulling the catches 31 forwardly therewith against the force of the springs 33 so as to release the pintle pin 26 from the slot 28.

The fifth-wheel plate 14 is flat except for the rear end portions 41—41 adjacent the ends of the slot 28, which are downwardly turned as shown in Fig. 6. Along the opposite sides, the fifth-wheel plate 14 has rectangular-shaped ear portions 42—42 which extend in a front-to-rear direction and are provided with a series of spaced holes 43—43. The ears 42—42 are spaced apart a distance corresponding to the spacing of the side members 22 of the gooseneck 7.

The fifth-wheel plate 14 is provided with lugs 44—44 on the underside thereof which are provided with transversely extending holes in order that an axle 45 may extend therethrough with the fifth-wheel plate being tiltable thereon. The axle 45 is supported at opposite ends in blocks 46—46 mounted on opposite sides of the chassis frame 47 as shown to advantage in Figs. 5 and 6. This arrangement permits the fifth-wheel plate 14 to tilt about the axis of the axle 45 which extends crosswise of the tractor 6.

The present invention makes use of the tilting feature of the fifth-wheel plate 14 by having the front end of the forwardly extending portion 13 of the gooseneck 7 provided with an upwardly and forwardly inclined bearing surface in the form of a plate 50 extending between opposite sides of the gooseneck 7 across the front end thereof. The bottom bearing surface of the plate 50 joins the front edge of the bottom or underside of the forwardly extending portion 13 as formed by the cross members 22 and the floor member 23. The member 50 is provided with a pair of holes 51—51 in opposite ends thereof which are arranged to register with holes 43 in the fifth-wheel plate 14 when the latter is tilted and the bearing plate 50 rests thereon as shown, for example, in Fig. 6.

In order to in part support the gooseneck 7 on the tractor 6 when the gooseneck is disconnected from the trailer 5, and to control and maintain the gooseneck in any desired tilted position, it is provided with a superstructure to provide a point of connection for the end of a chain or cable 52 running from a winch 53 carried on the tractor immediately in rear of the cab 54 thereof. The frame structure on top of the gooseneck 7 includes a pair of converging rods 55—55 extending upwardly from opposite sides of the forwardly extending portion 13 at points adjacent the front end thereof and meeting above the center of the front end so as to support a fixture 56 having an eye opening 57 in the front end thereof for receiving a hook 58 provided on the end of the chain 52.

The supporting frame for the fixture 56 also includes a pair of tie rods 60—60 which extend rearwardly from the member 56 to points on the tops of side members 22.

In Figs. 1, 2 and 5 of the drawings, the gooseneck drawbar unit 7 is shown in the relationship which it has with the tractor 6 and the trailer 5 during cross-country transport. The front end of the platform 8 of the trailer 5 is rigidly connected to the lower end of the downwardly depending or projecting rear portion 12 of the gooseneck 7. As explained above, in this rigid interconnected condition, the spaced apart male projections 15 on the front end of the platform 8 fit in and rest on the bottom of the fixtures 16 depending from the lower end of the rear portion 12 of the gooseneck 7, while the rearwardly extending plates 17 fit over the top of the platform 8. The locking pins 20 are put in place to maintain this rigid connection.

In the cross-country transport relationship, the pintle pin 26 depending from the underside of the forwardly extending portion 13 of the gooseneck 7, midway between the opposite sides thereof, is locked in the forward end of the slot 28 of the fifth-wheel plate 14 which is in a generally horizontal position, as shown in Figs. 1 and 5. This cross-country transport relationship between the gooseneck 7 and the trailer 5 and the tractor 6 is a conventional one and allows for a relative tilting action between the tractor 6 and the trailer 5, and also allows the tractor 6 to pivot or turn with respect to the trailer 5.

Assuming that the trailer 5 is loaded with a piece of heavy machinery, such as a power shovel, and it has been transported to the desired place for unloading, the tractor driver will block up the forward end of the trailer 5 adjacent the gooseneck 7 with suitable blocking as indicated at 61 in Fig. 3. The blocking 63 desirably takes the form of one or several timbers, and as a matter of convenience, these timbers or blocks may be carried with the trailer 5 so that they will be available for repeated usage.

The timbers or blocks 63 should have a height or thickness so that the front end of the platform 8 of the trailer 5 will be blocked up approximately to its height during transportation wherein the bed 8 is approximately level. However, the timbers should not be of such thickness that they have to be wedged and forced into place, since the installation of the blocking under such circumstances would be difficult and time-consuming, particularly since customarily only the driver of the tractor is available to handle the unloading operation.

Since the front end of the trailer 5 will thus not normally be blocked up to the full height which it has during cross-country transportation, and since there usually will be some settling of the timbers and corresponding settling or lowering of the front end when the weight of the load is transferred to the blocking, provision must be made for lowering of the gooseneck 7 in order that it may be disconnected from the trailer 5 easily and without binding. Furthermore, since the front end of the trailer 5 will be tilted downwardly somewhat when it settles to rest on the timbers or blocking, the gooseneck 7 must not only be lowered for easy detachment but it also must be tilted forwardly slightly to compensate for the downwardly tilting of the front end of the platform 8. The gooseneck 7 is so constructed for cooperation with the fifth-wheel plate 14 that such lowering and adjustable tilting of the gooseneck 7 are provided for.

After the timber 61 has been laid under the front end of trailer 5, the operator will proceed to connect the cable hook 58 to the fixture 56 through the eye 57 and draw up on the winch 53 to take up any slack. The lever 38 on the fifth-wheel plate 14 is then moved to the rear so as to release the pintle pin 26 from its position in the forward end of the slot 28. The operator will now pull the tractor 6 ahead gently, with the rear wheels of the trailer 5 being blocked if necessary, whereupon the fifth-wheel plate 14 will slip underneath the forwardly extending portion 13 of the gooseneck 7 until the bearing surface of the bearing plate 50 comes into engagement with the fifth-wheel plate 14 which thereupon tilts rearwardly as shown in Figs. 3 and 6. The chain 52 is maintained taut as the bearing plate 50 slides down the surface of the fifth-wheel plate 14, and this action is continued until the forward end of the trailer 5 settles to rest on the blocking 61. Such minor adjustment is made as may be necessary to bring one of the holes 51 on each side of the bearing plate 50 into register with one of the holes 43 on the corresponding side of the fifth-wheel plate 14, and then locking pins 62 (Fig. 6) are inserted in these opposite pairs of registering holes so as to prevent further displacement or relative movement between the plate 50 and the fifth-wheel plate 14. The gooseneck 7 is now in condition to be detached from the trailer 5 and the locking pins 20 are removed and the tractor 6 is pulled away, leaving the trailer resting on the blocking 61 as shown in Fig. 3 with the gooseneck 7 maintained on the tractor 6 in exactly the lowered and tilted position occupied by it when it was detached from the trailer 5.

The load on the trailer 5 may now be removed from the platform 8 and then the tractor 6 can be re-connected with the trailer 5. In re-coupling or re-connecting the gooseneck 7 to the front end of the trailer 5, it is merely necessary for the driver to back the tractor 6 until the fixtures 10 are brought into interfitting relationship with the projections 15 whereupon the locking pins 20 are replaced so as to re-establish the rigid connection between the gooseneck 7 and the trailer 5. Since the gooseneck 7 is continuously maintained in square relationship with the forward end of the trailer 5, this re-coupling can readily be made without adjustments or changes.

Once the rigid connection between the bottom end of the gooseneck 7 and the trailer 5 is re-established, the pins 62 securing together the bearing plate 50 and the fifth-wheel plate 14 are removed and the tractor 6 is backed so as to return the gooseneck 7 into transporting relationship with respect to the trailer 6 wherein the pintle pin 26 is locked into the end of the slot 28 in the fifth-wheel plate 14, as described above. The winch 53 may be used to assist in drawing the gooseneck 7 forwardly onto the fifth-wheel plate 14.

Since certain changes and modifications may be made in the embodiment described above in connection with the accompanying drawings without departing from the spirit and scope of the invention, it is intended that all matter described above or shown in the drawings shall be interpreted as illustrative and not in a limiting sense.

What is claimed as new is:

1. In a generally gooseneck-shaped drawbar unit for combination with (1) a tractor provided with a fifth-wheel plate which is rearwardly tiltable about an axis extending crosswise of the tractor, said fifth-wheel plate having at least one series of holes therein extending parallel to the length of said tractor, and (2) a low-bed heavy duty trailer having only rear support wheels, wherein said gooseneck-shaped drawbar unit comprises, a rigid frame structure having a forwardly extending portion for detachable pivotal connection with said tractor and a downwardly extending rear portion for detachable rigid connection with the front end of said trailer, connecting means on the lower end of said rear portion cooperative with connecting means on the front end of said trailer for rigidly connecting said rear portion with said trailer in detachable rigid relationship, and pivot connecting means on the underside of said forwardly extending portion cooperative with pivot connecting means on said fifth-wheel plate to form a releasable pivotal connection between said forwardly extending portion and said fifth-wheel plate whereby said frame structure is turnable on said fifth-wheel plate generally in the plane thereof, the improvement comprising plate means at the front end of said forwardly extending portion providing an upwardly and forwardly inclined bearing surface for bearing engagement with said fifth-wheel plate when the latter is in a rearwardly tilted position, said bearing surface being located forwardly of said pivot connecting means on the underside of said forwardly extending portion whereby when said pivotal connection is released longitudinal displacement between said drawbar unit and said tractor brings said bearing surface into bearing engagement with said fifth-wheel plate and said plate means having at least one hole therein which is longitudinally aligned with said series of holes in said fifth-wheel plate and is registrable with said holes one at a time when said bearing surface of the plate means is in engagement with said fifth-wheel plate.

2. In a generally gooseneck-shaped drawbar unit for combination with (1) a tractor provided with a fifth-wheel plate which is rearwardly tiltable about an axis extending crosswise of the tractor and having a winch mounted on said tractor, said fifth-wheel plate having integrally formed ear portions extending along opposite sides thereof and each ear having a series of holes therein located on a line parallel to the length of said tractor and (2) a low-bed heavy duty trailer having only rear support wheels, wherein said gooseneck-shaped drawbar unit comprises, a rigid frame structure having a forwardly extending portion for detachable pivotal connection with said tractor and a downwardly extending rear portion for detachable rigid connection with the front end of said trailer, connecting means on the lower end of said rear portion cooperative with connecting means on the front end of said trailer for rigidly connecting said rear portion to said trailer in detachable rigid relationship, a depending pintle pin on the underside of said forwardly extending portion located approximately on the longitudinal axis of said forwardly extending portion and at a substantial distance rearwardly of the front end of said forwardly extending portion, said pintle pin being adapted to be releasably locked in a central opening therefor in said fifth-wheel plate whereby said frame structure is turnable on said fifth-wheel plate generally in the plane thereof, and frame means extending above said forwardly extending end providing a place for attachment of a chain, cable or the like extending from said winch whereby said winch may be used to maintain and change the pivotal position of said drawbar unit about the axis of said fifth-wheel plate, the improvement comprising upwardly and forwardly inclined bearing plate means on the front end of said forwardly extending portion providing an upwardly and forwardly inclined bearing surface intersecting the bottom bearing surface of said forwardly extending portion, said bearing plate means having on opposite sides thereof at least one hole therein adapted to register in turn with the holes in one of said fifth-wheel plate ears when said pintle pin has been released and said drawbar unit has been longitudinally displaced relative to said tractor to a position wherein said upwardly and forwardly inclined bearing surface engages said fifth-wheel plate in a rearwardly tilted position, said position between said drawbar unit and said tractor being maintained by pins extending through registering sets of holes in said bearing plate means and said ears.

3. For combination with a tractor and a gooseneck type drawbar for detachably connecting a low-bed heavy duty trailer having rear support wheels only to said tractor, a fifth wheel comprising a fifth-wheel plate having a row of holes extending therethrough and extending lengthwise of said tractor when said plate is mounted thereon, said gooseneck type drawbar having an upwardly and forwardly inclined fifth wheel-engaging bearing plate on the front end thereof having at least one hole therein positioned to register in turn with the holes in said row thereof whereby pin means inserted through the registering holes may be used to prevent relative movement between said bearing plate and said fifth wheel.

4. For combination with a tractor and a gooseneck type drawbar unit for detachably connecting a low-bed heavy duty trailer having rear support wheels only to said tractor, a fifth wheel comprising, a fifth-wheel plate having a longitudinal ear portion extending integrally along at least one side thereof and having a row of holes therein extending lengthwise of said tractor, and means on said fifth-wheel plate whereby it may be tiltably supported on said tractor so as to be rearwardly tiltable about an axis extending crosswise of said tractor, said gooseneck type drawbar having an upwardly and forwardly inclined fifth wheel-engaging bearing plate on the front end thereof having at least one hole therein positioned to register in turn with the holes in said row thereof whereby pin means inserted through the registering holes may be used to prevent relative movement between said bearing plate and said fifth wheel.

5. For combination with a tractor and a gooseneck type drawbar unit for detachably connecting a low-bed heavy duty trailer having rear support wheels only to said tractor, a fifth wheel comprising, a fifth-wheel plate having a longitudinal ear portion extending integrally along opposite sides thereof, each ear having a row of holes therein extending lengthwise of said tractor when said fifth wheel is mounted thereon, means on said fifth-wheel plate whereby it may be tiltably supported on said tractor so as to be rearwardly tiltable about an axis extending crosswise thereof, and means on said fifth-wheel plate for releasably locking a pintle pin thereto, said gooseneck type drawbar having a pintle pin depending underneath the forwardly extending portion thereof and located inwardly of the front end thereof and also having an upwardly and forwardly inclined bearing plate secured to the front end thereof, said bearing plate having at least one hole therein adjacent the opposite sides of said gooseneck whereby when said bearing plate is engaging said fifth-wheel plate in a rearwardly tilted position said holes in said bearing plate will in turn register with the holes in said ears whereby pins inserted through the registering holes will maintain the relative position between said bearing plate and said fifth-wheel plate.

6. For detachably connecting a low-bed heavy duty trailer having rear support wheels only to a tractor, the combination of a gooseneck type drawbar and a fifth wheel, said fifth wheel comprising a fifth-wheel plate having a row of holes therein extending lengthwise of said tractor when said plate is mounted thereon, and means on said fifth-wheel plate whereby it may be tiltably supported on said tractor so as to be rearwardly tiltable about an axis extending crosswise thereof, said gooseneck type drawbar comprising, a rigid frame structure having a forwardly extending portion for detachable pivotal connection with said fifth-wheel plate and a downwardly extending rear portion for detachable rigid connection with the front end of said trailer, coupling means on the lower end of said rear portion cooperative with complementary coupling means on the front end of said trailer for rigidly coupling said gooseneck rear portion with said trailer in detachable rigid relationship, pivot connecting means on the underside of said forwardly extending gooseneck portion cooperative with pivot connecting means on said fifth-wheel plate to form a releasable pivotal connection therebetween, and an upwardly and forwardly inclined bearing plate on the front end of said forwardly extending gooseneck portion for engaging said fifth-wheel plate in a rearwardly tilted position, said bearing plate having at least one hole therein positioned to in turn register with the holes in said row thereof in said fifth-wheel plate whereby a pin may be inserted into the registering holes so as to maintain said bearing plate in any one of several relative positions on said fifth-wheel plate.

7. In the combination of a low-bed heavy duty trailer having rear support wheels only, a tractor having a winch mounted thereon, a fifth wheel on said tractor, and a gooseneck type drawbar detachably interconnecting said trailer to said tractor, the improvement wherein: said fifth wheel comprises a fifth-wheel plate having at least one row of holes therein extending lengthwise of said tractor when said plate is mounted thereon, means on said fifth-wheel plate cooperable with complementary means on said tractor for supporting said fifth-wheel plate on said tractor so as to be rearwardly tiltable about an axis extending crosswise thereof, and means on said fifth-wheel plate for releasably locking a pintle pin thereto; and, said gooseneck type drawbar comprises, a rigid frame structure having a forwardly extending portion for detachable pivotal connection with said fifth-wheel plate and a downwardly extending rear portion for detachable rigid connection with the front end of said trailer, coupling means on the lower end of said rear portion cooperative with complementary coupling means on the front end of said trailer for rigidly coupling said gooseneck rear portion with said trailer in detachable rigid relationship, a pintle pin on the underside of said forwardly extending portion spaced rearwardly from the front end thereof adapted to be releasably locked to said fifth-wheel plate by said releasable locking means carried thereon, an upwardly and forwardly inclined bearing plate on the front end of said forwardly extending gooseneck portion for engaging said fifth-wheel plate in a rearwardly tilted position, said bearing plate having at least one hole therein positioned to in turn register with the holes in said row thereof in said fifth-wheel plate whereby a pin may be inserted into the registering holes so as to maintain said bearing plate in any one of several relative positions on said fifth-wheel plate, and frame means on said rigid frame structure providing a place for attaching a cable running from said winch.

AUSTIN G. TALBERT.

REFERENCES CITED

The following references are of record in the file of this patent:

UNITED STATES PATENTS

| Number | Name | Date |
| --- | --- | --- |
| 1,922,359 | Edwards | Aug. 15, 1933 |
| 2,223,650 | Weber | Dec. 3, 1940 |
| 2,312,769 | Mosling | Mar. 2, 1943 |
| 2,489,112 | Talbert | Nov. 22, 1949 |